June 1, 1926.                J. B. HENDERSON              1,586,741
                              RANGE FINDER
                         Filed July 26, 1919       2 Sheets-Sheet 2
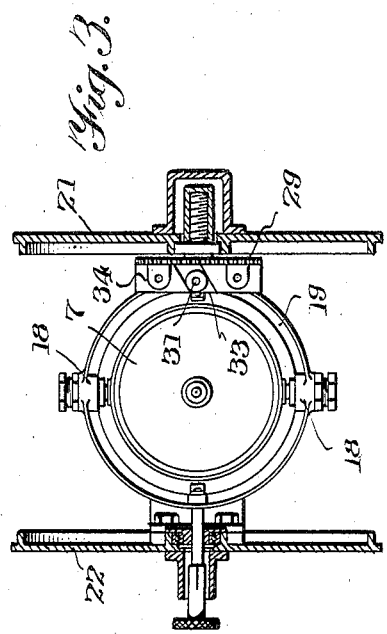
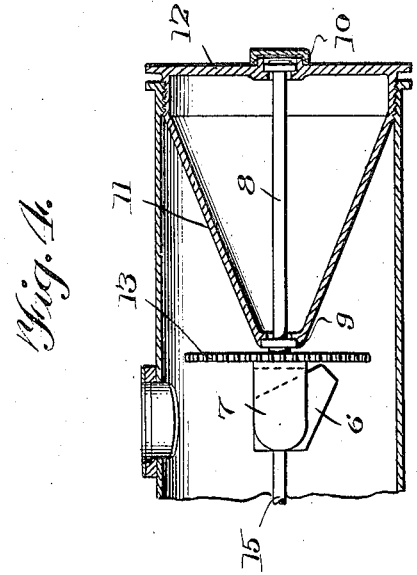
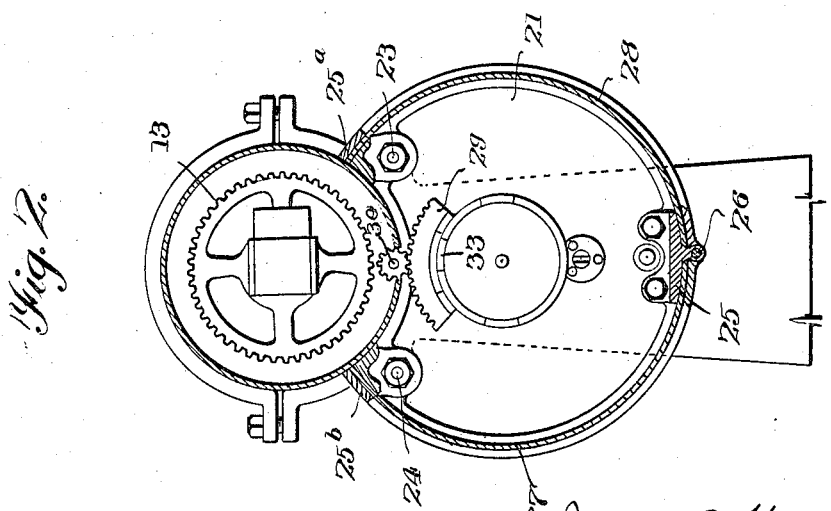
James B. Henderson,
    Inventor
By Moseley & Gill
    Attorneys Patented June 1, 1926.                                                                    1,586,741

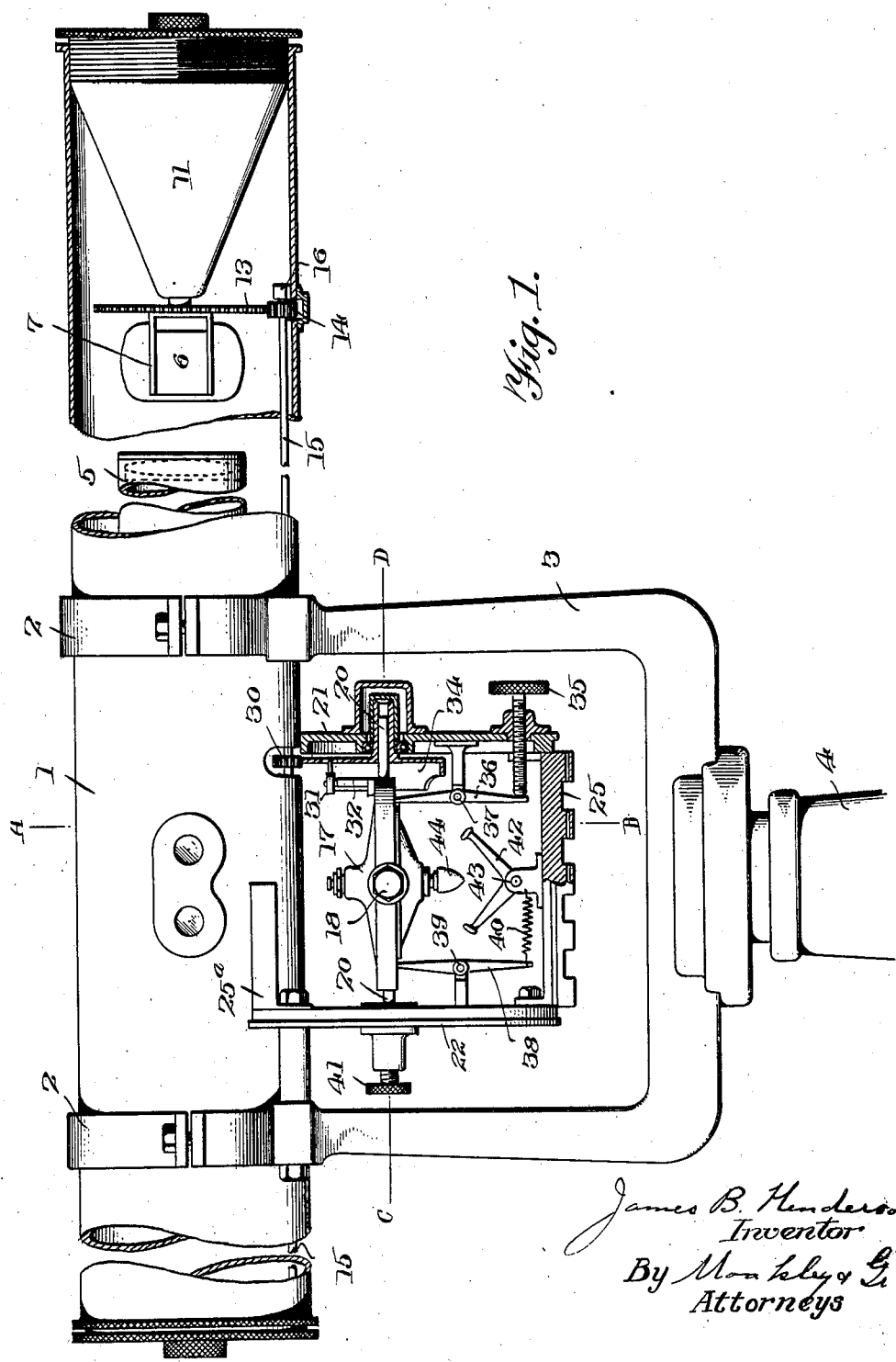

UNITED STATES PATENT OFFICE.

JAMES BLACKLOCK HENDERSON, OF LEE, ENGLAND.

RANGE FINDER.

Application filed July 26, 1919, Serial No. 313,539, and in Great Britain July 25, 1916.

(GRANTED UNDER THE PROVISIONS OF THE ACT OF MARCH 3, 1921, 41 STAT. L., 1313.)

My invention has for its object the provision of an improved single-observer range finder for use on a ship or other moving platform, which will materially assist the observer to keep the instrument laid on a target when the ship is rolling and pitching, by automatically compensating the effects of the angular motion of the ship upon the field of view.

Hitherto it has been proposed to mount range-finders and other optional apparatus on movable platforms such as ships with the interposition of gyroscopic or pendulum devices whereby the range-finder or the like is stabilized to maintain a line of sight unimpaired by the motion of the platform.

According to this invention I stabilize some or all of the optical parts such as for example the prisms, instead of stabilizing the range-finder as a whole, by linking said parts to a long period pendulum gyroscopic or otherwise, and I introduce a hand adjustment by which said parts which are stabilized may be moved relatively to the stabilizing device.

Figures 1 to 4 illustrate one method of applying my invention to a range-finder of the single observer type.

Figure 1 shows an elevation of the range-finder in part section with my gyroscopic attachment applied to it.

Figure 2 shows a cross section of the range finder tube and of the gyroscopic attachment on the line A—B, the telescope tube being removed from the range-finder.

Figure 3 shows a sectional plan of the gyroscopic attachment on the line C—D.

Figure 4 shows a sectional plan of the end of the range-finder tube to show the prism holder and its supports.

In Figure 1 the range-finder tube 1 is supported by the two rings 2 on the top of the two limbs of the fork 3 which is pivotally mounted on the pedestal 4, so that the range-finder may be trained in azimuth.

The inner telescope tube 5 of the range-finder carries the two objectives, the two eye-piece prisms and the range adjusting gear which are not shown and do not form part of my invention. The doubly reflecting prisms 6 of which there are two, one at each end of the base, are normally fixed to the outer tube.

In one method of applying my invention I mount each of the prisms 6 and its prism holder 7 on a short shaft 8 (Fig. 4) pivoted on two ball bearings 9 and 10 in a conical projection 11 formed on the end cap 12 of the range-finder tube 1. Each shaft 8 carries a spur wheel 13 and the two spur gear wheels with pinions 14 keyed to a long shaft 15 (Figure 1) which is mounted on bearings 16 on the tube 1. The shaft 15 serves to fix the relative "elevation" of the two prisms 6. I provide an adjustment to alter this relative "elevation" of the two prisms, that is the "halving" adjustment of the range-finder, by making the teeth of the spur gears 13—14 helical and to make the adjustment I move one of the shafts 8 axially along the range-finder tube by screwing the conical carrier 11 in or out of the tube 1.

I stabilize the two prisms 6 preferably by means of a gyroscope whose case 17 (Figures 1 and 3) is supported, with the rotor axis approximately vertical, on trunnion bearings 18 on a horizontal gimbal ring 19 the trunnions 20 of which are pivoted in bearings on two plates 21 and 22 each of which is bolted to the fork 3 by two bolts 23 and 24 (Figure 2) the two plates being rigidly connected at the bottom by the bridge piece 25 which also serves to carry the hinge 26 (Figure 2) of the two half covers 27 and 28, and at the top by the two angles 25ª and 25ᵇ.

The trunnion 20 of the gimbal ring 19 has keyed to it a spurwheel or sector 29 (Figures 1 and 2) of the same pitch diameter as the spur wheel 13 and this spur gears with a spur pinion 30 keyed to the shaft 15. The method of keying the sector 29 to the trunnion 20 is peculiar. The key consists of a roller 31 on the upper end of a short pillar 32 fixed to the gimbal ring 19. The roller 31 engages in a helical slot 33 (Figure 3) cut in the periphery of a drum 34 bolted to the toothed sector 29. The toothed sector and gimbal ring can turn freely on the bearings in the plates 21 and 22 and by moving the gyro 17 and its gimbal ring 19 parallel to the trunnions 20 the roller 31 turns the spur pinion 30 relatively to the trunnion 20 for the purpose of providing an adjustment for compensating the slow straying motion of the gyro. The gimbal ring 19 is translated paralled to the trunnion 20 by means of the screw 35 which rocks the lever 36 on its fulcrum 37, the upper end of the lever pressing on a ball on the inside of the ring 19 on the axis of the trunnion. The lever 38 turns on a fulcrum 39, and its control spring 40 serves to keep the screw 35 always in engagement with the lever 36.

If the gyro strays slowly in elevation round the trunnions 20 thereby elevating the prisms 6 and lowering the image of the target in the field of view of the rangefinder, a small motion of the screw 35 serves to bring the image back to the "separating line".

I provide a handle 41 keyed to one of the trunnions 20 to precess the gyro quickly about the trunnion axis 18 and bring the rotor axis again approximately vertical, should it deviate considerably from the vertical from any cause. The fork 42 keyed to the shaft 43 can be turned by means of a handle engaging on a square end of the shaft 43, so that one of the prongs comes in contact with the cone 44 attached to the gyro case 17, thus causing the gyro to precess quickly round the trunnions 20. This adjustment is useful should the screw adjustment 35 reach either of the limits of its motion due to exceptionally large straying of the gyro.

The arrangement illustrated stabilizes only the two end reflectors and as the ship rolls the image of a vertical mast becomes inclined to the vertical at the angle of heel, and a slight error in "halving" is then produced at the sides of the field which may introduce an error in range. In order to avoid this error I may employ the type of eyepiece prisms which make the lower image the inverted image of the upper when in proper coincidence.

Instead of stabilizing only the end reflectors I may alternatively stabilize the whole of the optical parts, the inner frame carrying the same being pivoted on bearings at the two ends of the outer tube, the manner of stabilizing this inner frame being by toothed gear similar to that described above say by means of a spur wheel attached to this inner frame and gearing with pinion 30 in Figure 1, or by any other suitable linkage. In such a case I preferably arrange the eyepoint of the range-finder so that it falls on or near the axis about which the frame is stabilized. The eyeguard or face piece I attach to the outer tube. Alternatively I may also fix the eye lens to the outer tube.

Having now particularly described and ascertained the nature of my said invention, and in what manner the same is to be performed, I declare that what I claim is:—

1. A range finder for use on an angularly moving body, comprising optical elements, a stabilizing device free from forced oscillations in phase with the disturbing forces introduced by the oscillations of the body and connections between the elements and the device for moving a part of the elements relatively to the body to compensate for the effect of its angular movement on the field of view of the range finder.

2. A range finder for use on an angularly moving body, comprising optical elements adapted to partake of the angular movement of the body, optical elements in optical relation to said first named elements and mounted to move relatively to the body, a stabilizing device free from forced oscillations in phase with the disturbing forces introduced by the oscillations of the body and connections between the device and the movable optical elements for moving them relatively to the body to compensate for the effect of its angular movement on the field of view of the range finder.

3. A range finder for use on an angularly moving body, comprising optical elements mounted to move relatively to the body, a stabilizing device free from forced oscillations in phase with the disturbing forces introduced by the oscillations of the body, connections between the elements and the device for moving the elements relatively to the body to compensate for the effect of its angular movement on the field of view of the range finder and axial means for producing angular adjustment between the device and the optical elements stabilized thereby.

4. A range finder for use on an angularly moving body, comprising optical elements, and connections between the elements and the gyroscope for moving a portion of the elements relatively to the body to compensate for the effect of its angular movement on the field of view of the range finder.

5. A range finder for use on an angularly moving body, comprising optical elements adapted to partake of the angular movement of the body, optical elements mounted to move relatively to the body and associated with said first named elements, and connections between the gyroscope and the last named optical elements for moving them relatively to the body to compensate for the effect of its angular movement on the field of view of the range finder.

6. A range finder for use on an angularly moving body, comprising optical elements mounted to move relatively to the body, connections between the elements and the gyroscope for moving the elements relatively to the body to compensate for the effect of its angular movement on the field of view of the range finder and axial means for producing angular adjustment between the device and the optical elements stabilized thereby.

7. A range finder for use on an angularly moving body, comprising a support, optical elements mounted on the support for movement relatively to the body, a gyroscope mounted on the support on mutually perpendicular axes, connections between the gyroscope and the optical elements for moving the latter relatively to the body to compensate for the effect of its angular movement on the field of view of the range finder and means for moving the gyroscope parallel to one of its supporting axes for effecting adjustments between the gyroscope and the optical elements stablized thereby.

8. A range finder for use on an angularly moving body, comprising optical elements mounted to move with the body, optical elements mounted to move relatively to the body, a gyroscope, connections between the gyroscope and the last named optical elements for moving the latter relatively to the body to compensate for the effect of its angular movement on the field of view of the range finder and means for controlling the position of the rotor axis of the gyroscope.

9. A range finder for use on an angularly moving body, comprising a support, optical elements mounted on the support for movement relatively to the body, a gyroscope mounted upon axes on the support, connections between the gyroscope and the optical elements for moving the latter relatively to the body to compensate for the effect of its angular movement on the field of view of the instrument and means for causing precession of the gyroscope about one of its supporting axes.

10. A range finder for use on an angularly moving body, comprising a support, optical elements mounted on the support for movement relatively to the body, a gyroscope mounted on the support on mutually perpendicular axes, connections between the gyroscope and the optical elements for moving the latter relatively to the body to compensate for the effect of its angular movement on the field of view of the instrument and means for producing precession of the gyroscope about each of its supporting axes.

11. A range finder for use on an angularly moving body, comprising a prism system mounted to move relatively to the body, optical elements associated with said prism system and mounted to move with the body, a gyroscope and connections between the prism system and the gyroscope for moving the system through an angle corresponding to the angle of movement of the platform to compensate for the effect of the movement of the platform upon the image of an object in the field of view of the range finder.

12. In a range finder for use on an angular moving body and having objectives, eye-piece prisms and reflecting prisms, a casing, a member associated with the casing and carrying the objectives and eye-piece prisms, members movably mounted within the casing and carrying the reflecting prisms, a gyroscope and connections between the gyroscope and the movably mounted members for moving the members and the prisms carried thereby relatively to the casing and the member which carries the objectives and eye-piece prisms to compensate for the effect of the angular movement of the body on the field of view of the range finder.

13. A range finder for use on an angularly moving body, comprising optical elements mounted to move relatively to the body, a stabilizing device free from forced oscillations in phase with the disturbing forces introduced by the oscillations of the body and connections between the device and the optical elements for communicating to said elements a fraction of the relative movement between the device and the body.

JAMES BLACKLOCK HENDERSON.